United States Patent
Rexius et al.

(10) Patent No.: US 8,100,220 B2
(45) Date of Patent: Jan. 24, 2012

(54) VEHICLE HAVING AUXILIARY STEERING SYSTEM

(75) Inventors: Arlen Rexius, Eugene, OR (US); David L. Looney, Monroe, OR (US); Chris Wyckoff, Corbett, OR (US)

(73) Assignee: Rexius Forest By-Products, Inc., Eugene, OR (US)

( * ) Notice: Subject to any disclaimer, the term of this patent is extended or adjusted under 35 U.S.C. 154(b) by 320 days.

(21) Appl. No.: 12/412,726

(22) Filed: Mar. 27, 2009

(65) Prior Publication Data

US 2009/0242316 A1    Oct. 1, 2009

Related U.S. Application Data

(60) Provisional application No. 61/040,528, filed on Mar. 28, 2008, provisional application No. 61/044,361, filed on Apr. 11, 2008.

(51) Int. Cl.
B62B 5/06    (2006.01)
A01B 69/00    (2006.01)

(52) U.S. Cl. .......................................... 180/417; 701/41

(58) Field of Classification Search ................ 701/2, 41, 701/42; 180/417, 419, 405, 406, 407, 78, 180/333
See application file for complete search history.

(56) References Cited

U.S. PATENT DOCUMENTS

| | | | |
|---|---|---|---|
| 547,024 A | 10/1895 | Neale | |
| 909,423 A | 1/1909 | Keller | |
| 1,310,454 A | 7/1919 | Stuart | |
| 1,371,451 A | 3/1921 | Stacy | |
| 1,560,203 A | 11/1925 | Carey | |
| 1,629,315 A | 5/1927 | Scott | |
| 2,063,086 A | 12/1936 | FitzGerald | |
| 2,066,137 A | 12/1936 | Frank | |
| 2,201,279 A | 5/1940 | Willing | |
| 2,579,025 A | 12/1951 | Donselaar | |
| 2,761,578 A | 9/1956 | Brownlee et al. | |
| 2,812,052 A | 11/1957 | Doyer | |
| 2,842,897 A | 7/1958 | Finn | |
| 3,051,298 A | 8/1962 | Knight | |
| 3,075,813 A | 1/1963 | Vohl | |
| 3,103,754 A | 9/1963 | Wieger | |
| 3,199,679 A | 8/1965 | Salyer, Jr. | |
| 3,219,275 A | 11/1965 | Green | |
| 3,220,555 A | 11/1965 | Silha | |
| 3,374,635 A | 3/1968 | Crandall | |
| 3,379,372 A | 4/1968 | Nemmaier et al. | |
| 3,412,943 A | 11/1968 | Lewis et al. | |
| 3,493,136 A | 2/1970 | Spellman, Jr. | |

(Continued)

OTHER PUBLICATIONS

Non-Final Office Action dated Sep. 2, 2009 for U.S. Appl. No. 11/625,741.

(Continued)

*Primary Examiner* — J. Allen Shriver, II
*Assistant Examiner* — James M Dolak
(74) *Attorney, Agent, or Firm* — K&L Gates LLP (57) ABSTRACT

A mobile material placer with an auxiliary steering system having a direct hydraulic drive mechanism. The mobile material placer includes a body, a material hopper coupled to the body and configured to receive and store material, a feeder conveyor coupled to the body, and a placer conveyor pivotally coupled to the body. The auxiliary steering system includes a direct hydraulic drive mechanism coupled to the steering column and which causes the steering column to rotate bidirectionally in response to fluid flow from a hydraulic pump.

22 Claims, 5 Drawing Sheets

U.S. PATENT DOCUMENTS

| | | | |
|---|---|---|---|
| 3,520,434 | A | 7/1970 | Benchoff et al. |
| 3,561,219 | A | 2/1971 | Nishizawa et al. |
| 3,617,566 | A | 11/1971 | Oshima et al. |
| 3,696,623 | A | 10/1972 | Heine et al. |
| 3,760,517 | A | 2/1973 | Blaauw |
| 3,847,722 | A | 11/1974 | Kistner |
| 3,850,283 | A | 11/1974 | Nordstrom |
| 3,871,182 | A | 3/1975 | Estruco |
| 3,876,260 | A | 4/1975 | Moss et al. |
| 3,903,977 | A | 9/1975 | Gillette et al. |
| 3,942,457 | A | 3/1976 | Keyes et al. |
| 3,957,098 | A | 5/1976 | Hepworth et al. |
| 3,963,138 | A | 6/1976 | Fowler |
| 4,005,010 | A | 1/1977 | Lunt |
| 4,023,689 | A | 5/1977 | Taylor et al. |
| 4,031,003 | A | 6/1977 | Husky |
| 4,076,460 | A | 2/1978 | Roof |
| 4,081,074 | A | 3/1978 | Stone |
| 4,117,905 | A | 10/1978 | Mustered |
| 4,152,004 | A | 5/1979 | Schroder |
| 4,182,491 | A | 1/1980 | Parke et al. |
| 4,301,959 | A | 11/1981 | Benteler et al. |
| 4,343,389 | A | 8/1982 | Ponstein |
| 4,345,680 | A | 8/1982 | Kay |
| 4,350,358 | A | 9/1982 | Ferris |
| 4,353,946 | A | 10/1982 | Bowers |
| 4,368,813 | A | 1/1983 | Mailliet |
| 4,373,738 | A | 2/1983 | Lane |
| 4,379,669 | A | 4/1983 | Wilson |
| 4,421,331 | A | 12/1983 | Ferris |
| 4,470,242 | A | 9/1984 | Swetnam et al. |
| 4,497,712 | A | 2/1985 | Cowling |
| 4,524,916 | A | 6/1985 | Keyes et al. |
| 4,599,015 | A | 7/1986 | Krambrock |
| 4,635,576 | A | 1/1987 | Bowers |
| 4,655,637 | A | 4/1987 | Vignocchi |
| 4,681,205 | A | 7/1987 | Hoffmann et al. |
| 4,712,717 | A | 12/1987 | Egerdahl |
| 4,726,175 | A * | 2/1988 | Day et al. .................... 56/10.2 F |
| 4,749,055 | A | 6/1988 | Momiyama |
| 4,776,750 | A * | 10/1988 | Griswold et al. ............. 414/698 |
| 4,781,513 | A | 11/1988 | Sjogren et al. |
| 4,784,773 | A | 11/1988 | Sandberg |
| 4,788,790 | A | 12/1988 | Zeager |
| 4,796,714 | A | 1/1989 | Momiyama |
| 4,808,024 | A | 2/1989 | Haas |
| 4,818,139 | A | 4/1989 | Brock et al. |
| 4,856,814 | A | 8/1989 | Jones |
| 4,874,283 | A | 10/1989 | Hurley, Jr. |
| 4,897,183 | A | 1/1990 | Lewis et al. |
| 4,944,630 | A | 7/1990 | Brock et al. |
| 4,955,445 | A * | 9/1990 | Kauss .......................... 180/406 |
| 4,979,960 | A | 12/1990 | Rexius et al. |
| 5,015,123 | A | 5/1991 | Houck et al. |
| 5,035,439 | A | 7/1991 | Petrillo |
| 5,042,240 | A | 8/1991 | Rocca et al. |
| 5,044,867 | A | 9/1991 | Pettijohn |
| 5,051,028 | A | 9/1991 | Houck et al. |
| 5,082,398 | A | 1/1992 | Subic |
| 5,096,336 | A | 3/1992 | Merrett et al. |
| 5,100,277 | A | 3/1992 | Musil |
| 5,154,543 | A | 10/1992 | Houck et al. |
| 5,181,804 | A | 1/1993 | Wysong et al. |
| 5,207,551 | A | 5/1993 | Yelton |
| 5,211,258 | A * | 5/1993 | Wibom ........................ 180/275 |
| 5,282,641 | A | 2/1994 | McLaughlin |
| 5,301,766 | A | 4/1994 | Momiyama et al. |
| 5,343,972 | A | 9/1994 | Balmer |
| 5,361,711 | A | 11/1994 | Beyerl |
| 5,470,175 | A | 11/1995 | Jensen et al. |
| 5,529,434 | A | 6/1996 | Swisher, Jr. |
| 5,551,524 | A * | 9/1996 | Yamamoto et al. .......... 180/6.62 |
| 5,556,237 | A | 9/1996 | Rexius |
| 5,564,205 | A | 10/1996 | Smith |
| 5,588,947 | A | 12/1996 | Studer et al. |
| 5,646,845 | A | 7/1997 | Gudat et al. |
| 5,769,502 | A | 6/1998 | Bettini |
| 5,817,184 | A | 10/1998 | Lawrence |
| 5,819,950 | A | 10/1998 | McCloskey |
| 5,826,676 | A | 10/1998 | Ko |
| 5,888,044 | A | 3/1999 | Baskerville |
| 5,921,708 | A * | 7/1999 | Grundl et al. ................ 404/84.1 |
| 5,996,722 | A | 12/1999 | Price |
| 6,015,019 | A * | 1/2000 | Grimes et al. ............... 180/53.2 |
| 6,036,406 | A | 3/2000 | Rexius |
| 6,058,629 | A | 5/2000 | Peterson et al. |
| 6,092,668 | A | 7/2000 | Lewis et al. |
| 6,155,175 | A | 12/2000 | Rude et al. |
| 6,164,556 | A | 12/2000 | Dupre et al. |
| 6,266,596 | B1 | 7/2001 | Hartman et al. |
| 6,283,697 | B1 | 9/2001 | Pierce et al. |
| 6,302,257 | B1 | 10/2001 | Woods |
| 6,305,896 | B1 | 10/2001 | Szentimery |
| 6,357,971 | B1 | 3/2002 | Rexius |
| 6,447,238 | B1 | 9/2002 | Brown |
| 6,464,426 | B1 | 10/2002 | Girouard |
| 6,585,452 | B1 | 7/2003 | Hoeck, Jr. |
| 6,695,220 | B2 | 2/2004 | Vollmer |
| 6,722,816 | B2 | 4/2004 | Hoeck, Jr. et al. |
| 6,776,557 | B2 | 8/2004 | Barnat et al. |
| 6,779,624 | B2 | 8/2004 | Yuasa et al. |
| 6,805,516 | B2 | 10/2004 | Barnat et al. |
| 6,845,859 | B2 | 1/2005 | Grundl |
| 6,896,092 | B2 * | 5/2005 | Stall ............................. 180/403 |
| 7,080,703 | B2 | 7/2006 | David et al. |
| 7,083,069 | B2 | 8/2006 | Wysong et al. |
| 7,099,751 | B2 * | 8/2006 | DePrez et al. .................... 701/2 |
| 7,125,204 | B2 | 10/2006 | Wysong |
| 7,134,829 | B2 | 11/2006 | Quenzi et al. |
| 7,160,056 | B1 | 1/2007 | Hoffmann et al. |
| 7,188,991 | B1 | 3/2007 | Weiler |
| 7,201,536 | B1 | 4/2007 | Westbrook et al. |
| 7,275,893 | B2 | 10/2007 | Rexius et al. |
| 7,303,145 | B2 | 12/2007 | Wysong |
| 7,519,464 | B2 * | 4/2009 | Sakugawa ....................... 701/70 |
| 7,604,300 | B2 | 10/2009 | Whitfield, Jr. et al. |
| 7,900,742 | B2 * | 3/2011 | Kubokawa et al. ........... 180/402 |
| 7,924,171 | B2 * | 4/2011 | Kawabata et al. ......... 340/932.2 |
| 2002/0092696 | A1 | 7/2002 | Bohner et al. |
| 2002/0121430 | A1 | 9/2002 | Grundl |
| 2003/0217550 | A1 | 11/2003 | Catellani |
| 2004/0060798 | A1 | 4/2004 | Grundl |
| 2004/0182636 | A1 | 9/2004 | Pedersen et al. |
| 2005/0005815 | A1 | 1/2005 | Forbes et al. |
| 2005/0060066 | A1 * | 3/2005 | Buehler et al. ..................... 701/2 |
| 2005/0092542 | A1 * | 5/2005 | Turner .......................... 180/446 |
| 2005/0121546 | A1 | 6/2005 | Musso et al. |
| 2005/0205337 | A1 | 9/2005 | Porskrog et al. |
| 2006/0006020 | A1 | 1/2006 | Ono et al. |
| 2006/0239806 | A1 * | 10/2006 | Yelton .......................... 414/502 |
| 2006/0264290 | A1 | 11/2006 | Arbanas |
| 2006/0271263 | A1 * | 11/2006 | Self et al. ........................ 701/50 |
| 2007/0021888 | A1 | 1/2007 | Ephraim |
| 2007/0078578 | A1 | 4/2007 | Liaw et al. |
| 2007/0193817 | A1 | 8/2007 | Kogel et al. |
| 2008/0040001 | A1 | 2/2008 | Ogawa et al. |
| 2008/0059026 | A1 | 3/2008 | Akiyama |
| 2008/0097670 | A1 | 4/2008 | Ogawa et al. |
| 2008/0142291 | A1 | 6/2008 | Rathke et al. |
| 2008/0173736 | A1 | 7/2008 | Looney |
| 2008/0196966 | A1 | 8/2008 | Maruyama et al. |
| 2008/0243339 | A1 | 10/2008 | Nishimori et al. |
| 2008/0303336 | A1 | 12/2008 | Whitfield et al. |
| 2009/0105907 | A1 | 4/2009 | Yamaguchi et al. |
| 2009/0138158 | A1 | 5/2009 | Gruel et al. |
| 2009/0194361 | A1 | 8/2009 | Eisenbarth |

OTHER PUBLICATIONS

Series WE-LA; IMO; pp. 6-7, 32-33, and 52-53.
Final Office Action dated Mar. 7, 2011 for U.S. Appl. No. 11/625,747.
Non-final Office dated Aug. 30, 2010 for U.S. Appl. No. 11/625,747.

* cited by examiner

VEHICLE HAVING AUXILIARY STEERING SYSTEM

PRIORITY

This application claims priority to and benefit of U.S. Provisional Application No. 61/040,528 filed Mar. 28, 2008, entitled, "Vehicle Having Auxiliary Steering System" and U.S. Provisional Application No. 61/044,361, filed Apr. 11, 2008, entitled, "Vehicle Auxiliary Steering System," the entire contents of which are incorporated herein for all purposes.

BACKGROUND OF INVENTION

It is well known that many tasks such as: the construction of driveways, roadways, and asphalt surfaces; the back filling of retaining walls; and the distribution of aggregate, mulch, soil and the like, can be extremely labor intensive. For example, delivery of aggregate to a roadway construction site typically involves: (i) loading a dump truck at an aggregate storage facility, (ii) transporting the aggregate to the construction site, (iii) dumping the aggregate in a mound, (iv) manually filling a wheelbarrow, (v) wheeling the aggregate to a selected location, and (iv) dumping the wheelbarrow load at that location. Each of these steps involves a great deal of time and labor. Furthermore, at each of these steps material may be spilled, wasted or otherwise strewn about the construction site. This waste results in an unsightly and potentially environmentally hazardous construction site and can create a potential road hazard if gravel material is picked up by the tires of passing vehicles and thrown into the air. This picked-up material can injure unprotected pedestrians or damage property such as the windshields of passing vehicles.

To address the inefficiencies inherent in these steps, a number of mobile material placers have been designed. Certain of these known mobile placers include an auxiliary power train and an auxiliary steering system to enable remote operation of the vehicle. The auxiliary power train or drive train enables an operator to drive the vehicle back and forth at a controlled velocity. The auxiliary steering system enables an operator to remotely rotate the steering column to turn or steer the moving vehicle.

Certain known auxiliary steering systems unitize an indirect driving mechanism to rotate the steering column. These auxiliary steering systems having an indirect steering drive generally incorporate a sprocket, chain and jackshaft combination. However, when the material placer is operated, foreign material or the conveyed material, such as sand, rocks or dirt can become caught or otherwise interfere with the moving parts of the auxiliary steering mechanism. In particular, the material may become caught between the chain, sprocket and jackshaft. This causes excessive wear of the indirect driving mechanism, thus leading to high costs in replacement parts and increased downtime. When the steering angle changes with the known chain and sprocket system, binding or breakage in the moving parts can occur which can cause reliability issues. Moreover, slack in the chains can cause reduced steering precision.

It would be advantageous to provide a system, apparatus and/or method that addresses these limitations and simplifies the process of constructing and/or maintaining a roadway or distributing material around a construction site.

SUMMARY OF INVENTION

In one embodiment, a vehicle is provided with an auxiliary steering system having a direct hydraulic drive motor and auxiliary drive system for remotely controlling both the direction and forward and backward motion of the vehicle. The vehicle can be operated in a manual mode by a driver in a cab of the vehicle, or in a remote mode. In the manual mode, the operator steers the vehicle by turning a steering wheel connected to a steering shaft, and operates the accelerator to move the vehicle forward and backward. In the remote mode, the auxiliary drive and auxiliary steering systems enable remote control of the vehicle speed and direction by a vehicle operator located out of the vehicle cab.

The auxiliary steering system includes a direct hydraulic drive motor coupled to the steering column. A remote control unit transmits signals wirelessly to a receiver and a control box, which regulates the valves to direct fluid flow through the direct drive hydraulic motor. The flow of hydraulic fluid through the direct hydraulic drive motor is controlled by directional valves. Accordingly, the mobile placer having an auxiliary steering system with a direct hydraulic drive enables the vehicle to be steered remotely from the vehicle cab.

In one embodiment, a vehicle is provided that includes a frame; a vehicle steering system wherein at least a portion of the vehicle steering system is mounted to the frame; a rotatable steering column; wheels coupled to the steering column and configured to turn in response to a rotation of the steering column; and an auxiliary steering system configured to rotate the steering column during remote operation of the material placer, the auxiliary steering mechanism including a direct hydraulic drive motor.

In an embodiment, the vehicle is a mobile material placer. In an embodiment, the vehicle includes a remote control system configured to wirelessly transmit signals to a controller, the controller configured to control at least the operation of the auxiliary steering system. In an embodiment, the vehicle includes control means for remotely transmitting signals to the auxiliary steering system, the signals causing hydraulic fluid to flow in a bidirectional manner through the direct hydraulic drive mechanism. In an embodiment, the auxiliary steering system further includes, a hydraulic pump, and a hydraulic fluid reservoir, the hydraulic drive motor and the hydraulic pump fluidly connected to the hydraulic fluid reservoir.

In one embodiment, a mobile material placer is provided. The mobile material placer includes a body and a material hopper coupled to the body and configured to receive and store material. The material placer includes a feeder conveyor coupled to the body. The feeder conveyor is configured to receive material stored by the material hopper. A placer conveyor is coupled pivotally to the body and has an in-feed end and a discharge end. The in-feed end of the placer conveyor is alignable with a discharge end of the feeder conveyor. The mobile material placer includes both an auxiliary drive mechanism and an auxiliary steering system. The auxiliary drive mechanism is configured to rotate a driveline during remote operation of the material placer, thereby causing the vehicle to move backward and forward. The auxiliary steering system causes rotation of a steering column of the vehicle and includes a direct hydraulic drive mechanism coupled to the steering column.

In an embodiment, the mobile material placer further includes a hydraulic drive motor coupled to the steering column, a hydraulic pump, and a hydraulic fluid reservoir, the hydraulic drive motor and the hydraulic pump fluidly connected to the hydraulic fluid reservoir.

In an embodiment, hydraulic drive motor includes a first hydraulic fluid port and a second hydraulic fluid port, and rotates the steering column in a bidirectional manner in response to hydraulic fluid flow from the hydraulic pump.

In an embodiment, the direct hydraulic drive mechanism is mounted to the steering column in an inline fashion.

In an embodiment, the mobile material placer includes a remote control system configured to control at least the operation of the auxiliary steering system.

In an embodiment, the direct hydraulic drive motor is a rotary vane type motor.

In an embodiment a method of dispensing material using a mobile material placer is provided. The method includes: loading material into a material hopper; conveying the material from an in-feed end of a feeder conveyor to a discharge end of the feeder conveyor; discharging the material from the discharge end of the feeder conveyor to an in-feed end of a placer conveyor, said placer conveyor including an endless conveyor belt frictionally driven about a plurality of rollers; transmitting a signal remotely to cause hydraulic fluid to be pumped through a direct drive hydraulic motor coupled to a steering column, thus causing rotation of the steering column; conveying the material from the in-feed end of the placer conveyor to a discharge end of the placer conveyor; and discharging the material from the discharge end of the placer conveyor to a worksite. In an embodiment, the direct drive hydraulic motor is coupled to the steering column, a hydraulic pump, and a hydraulic fluid reservoir, the direct drive hydraulic motor and the hydraulic pump fluidly connected to the hydraulic fluid reservoir. In an embodiment, the method includes bidirectionally pumping fluid through the direct drive hydraulic motor, wherein the hydraulic motor includes a first hydraulic fluid port and a second hydraulic fluid port. In an embodiment, the method of dispensing material includes controlling remotely at least the operation of the steering column.

In the embodiments described above, because the direct hydraulic drive motor of the auxiliary steering system does not include exposed moving parts such as chains and sprockets, wear and tear of the steering system due to any dislodged conveyed material or other foreign material can be substantially avoided. Moreover, the turning precision of the vehicle can be improved due to the direct hydraulic drive motor.

Additional features and advantages are described herein, and will be apparent from, the following Detailed Description and the figures.

DETAILED DESCRIPTION

A mobile material placer or slinger constructed according to the teachings of the present disclosure includes a body coupled to a frame, a material hopper attached to the body, a primary conveyor coupled to the body, where the primary conveyor is positioned and arranged to receive material from the material hopper. A placer conveyer is pivotally coupled to the body and adjustable side-to-side and up and down relative to the body. The placer conveyor is positioned and arranged to receive material from the primary conveyor and rapidly discharge, sling or fling material to a worksite. Accordingly, the material placers of the present embodiments are able to rapidly direct and project material such as, for example, aggregate, across a job site to a desired location that may not be accessible to the mobile placer, while also having the ability to simultaneously move or drive.

It should be appreciated that although the direct drive hydraulic motor is described below with respect to an auxiliary steering system of a mobile material placer, the direct drive mechanism may be used in an auxiliary steering system of other commercial vehicles that use a remote steering function. Such vehicles can include, but are not limited to, cement mixing trucks, pavers, seeders, water trucks, and material spraying vehicles.

Mobile Placer

Figure 1:
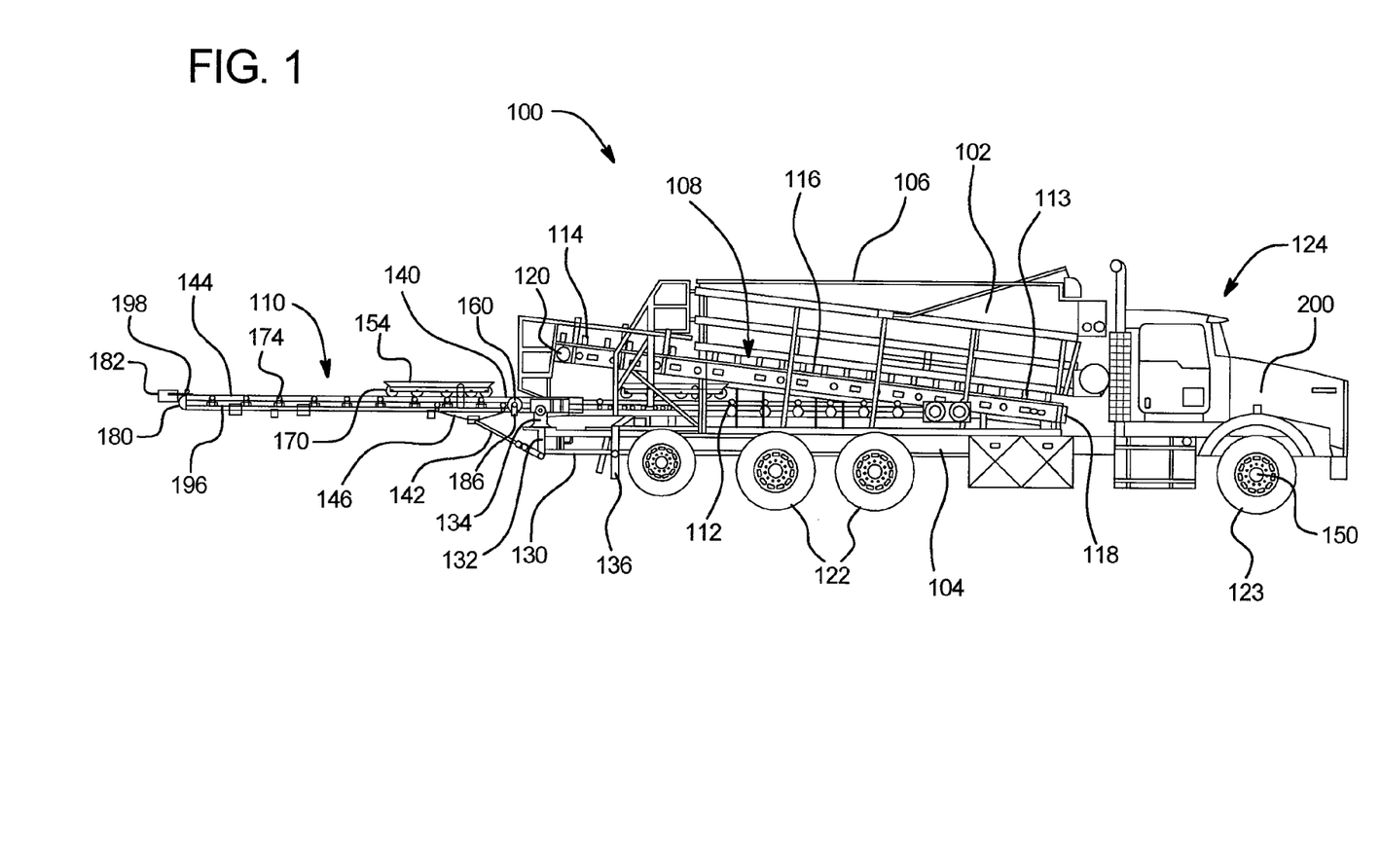
FIG. 1 is a side view of a mobile placer with a placing conveyor and an auxiliary steering system having a direct hydraulic drive mechanism.
Figure 2:
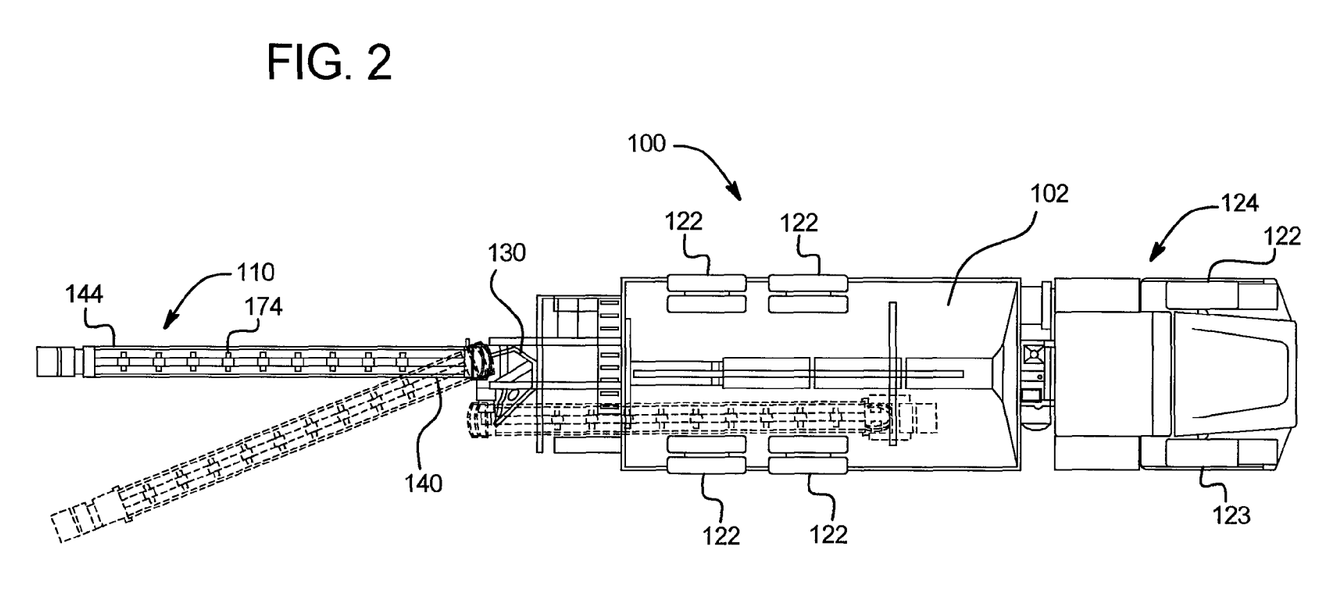
FIG. 2 is a top view of a mobile placer with a placing conveyor and an auxiliary steering system having a direct hydraulic drive mechanism.
Figure 3:
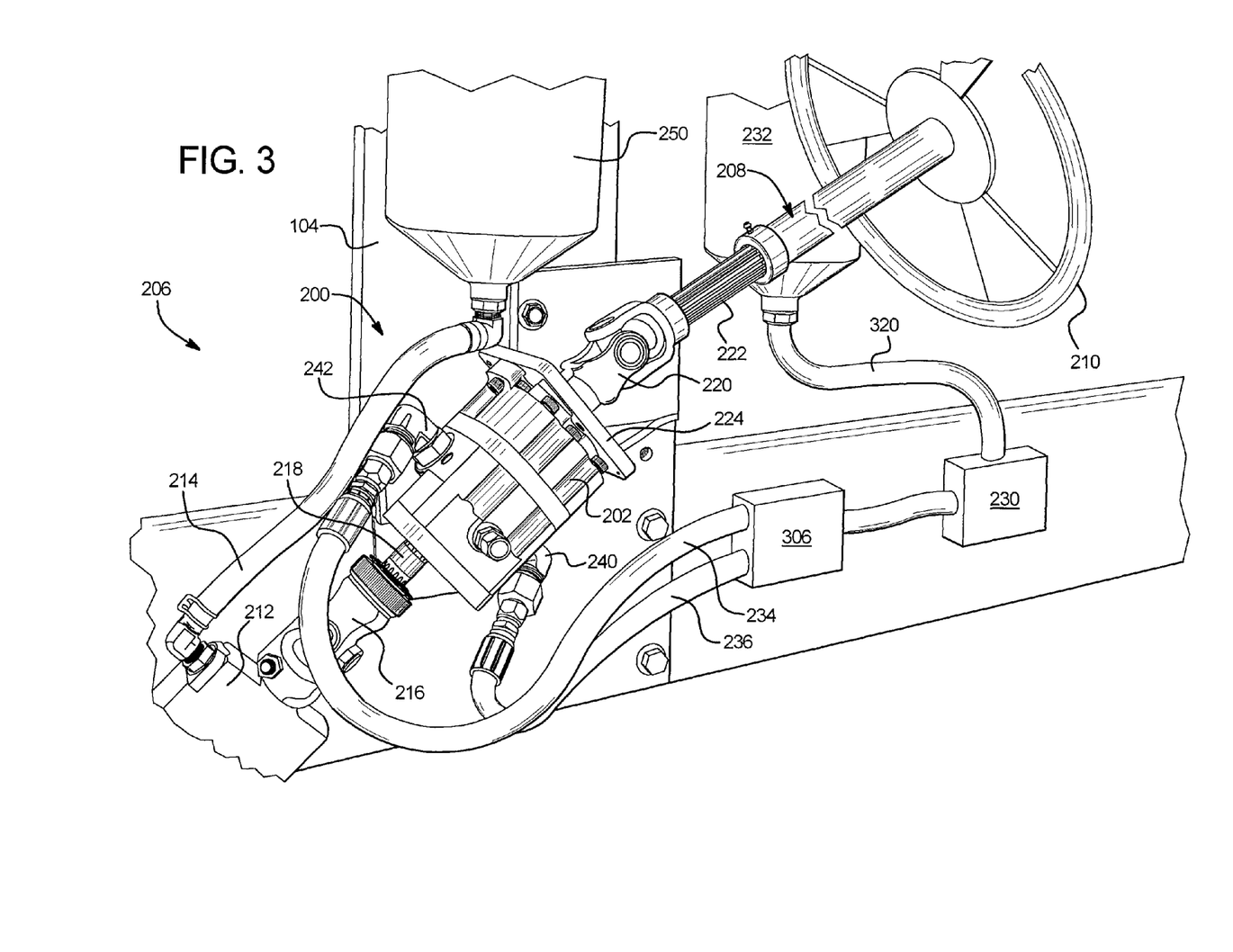
FIG. 3 is a partial perspective view of an embodiment of a mobile placer with an auxiliary steering system having a direct hydraulic drive mechanism.
Figure 4:
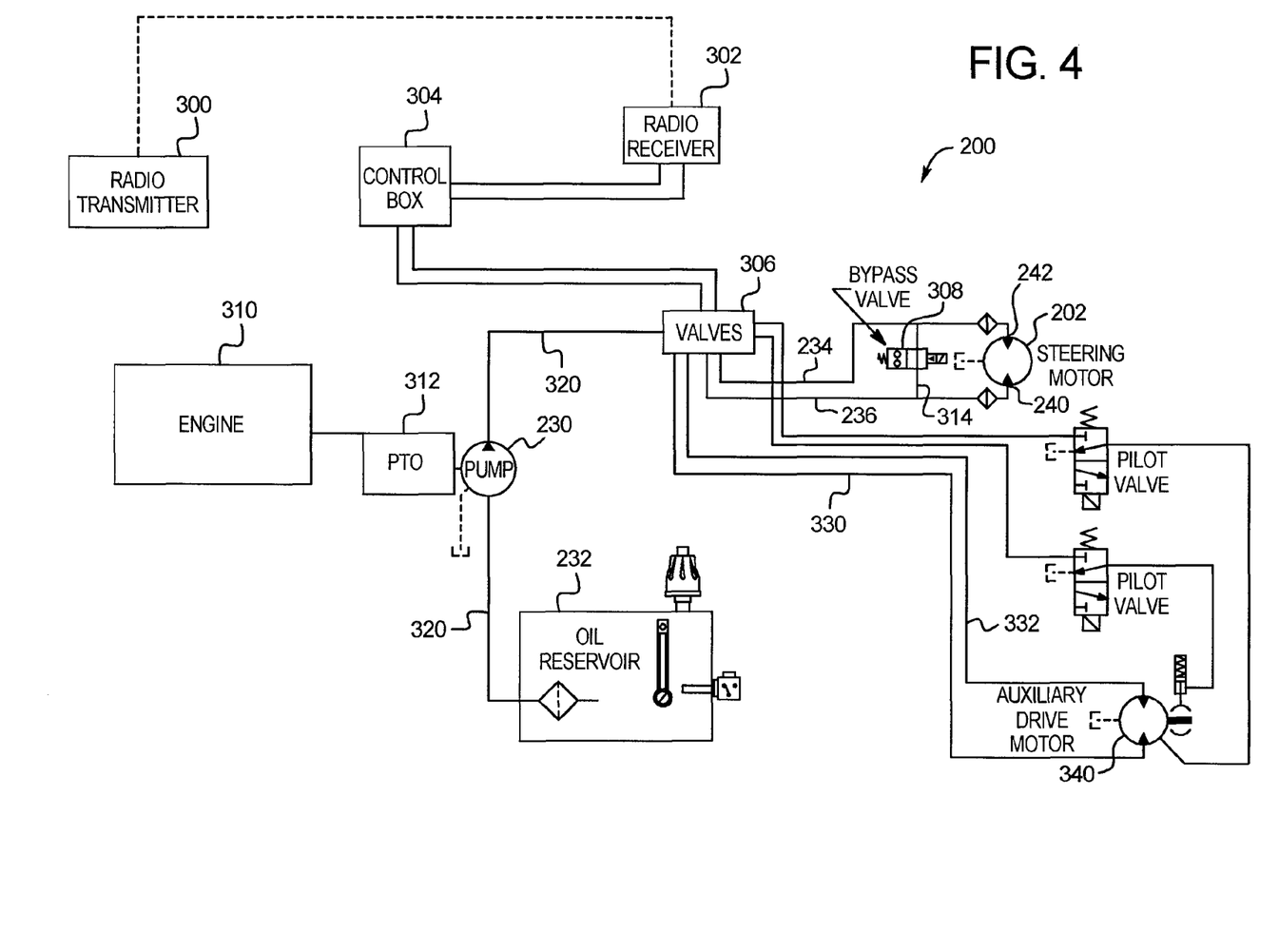
FIG. 4 is a schematic view of an auxiliary drive and auxiliary steering system.

Referring to the drawings, FIGS. 1 and 2 illustrate an example of a mobile placer 100 or slinger according to one embodiment, which includes an auxiliary steering system 200. The auxiliary steering system 200 enables the mobile placer 100 to be remotely steered by transmitting radio signals from a remote control unit or transmitter 300 (FIG. 4). As described in further detail below, auxiliary steering system 200 is driven by a direct drive hydraulic motor 202 (FIG. 3). Mobile placer 100 in the illustrated embodiment further includes a truck chassis, an operator cab 124, a body 102 coupled to and carried by a frame 104, a material hopper 106 mounted integrally to the frame 104, a primary conveyor 108, and a high-speed placing or placer conveyor 110 which is mounted pivotally to frame 104. It should be appreciated that in other embodiments, the mobile placer does not have a cab 124 and is driven instead remotely by an operator.

In one embodiment, mobile placer 100 is configured to operate on a truck chassis such as, for example, a KENWORTH® T-800 premium truck chassis. Other truck or heavy-duty chassis may be used alternatively. In one exemplary embodiment, mobile placer 100 is mounted to a truck frame 104, which includes, for example, a SPICER® EFA twenty-thousand pound (lb) front axel and a SPICER® DSH forty-thousand pound (lb) rear axel. Mounted to the rear axel is at least one set of rear tires 122, and mounted to the front axel is a set of front tires 123. Mobile placer 100 also includes a truck cab 124, an engine (not shown), and a drive train 112. In one example, the engine is a CATERPILLAR® C-13 engine with four hundred-thirty horsepower ("hp") and sixteen-hundred and fifty lb-ft of torque. The engine is alternatively a CATERPILLAR® model 3054C 86HPTM Tier 2 compliant engine. Other truck or heavy-duty engines may be used alternatively. The engine moves or drives mobile placer 100 in a forward or reverse direction. The engine also drives a hydraulic motor which in turn drives the auxiliary steering system 200 and other components of mobile placer 100.

In operation, the material to be conveyed or dispensed is loaded into the material hopper 106 by, for example, a back how, skid steer or excavator, and is gravity fed onto a first end 114 of the primary conveyor 108. The material hopper 106 may be constructed of a high tensile strength steel, such as ten gauge sheeting, that meets required ratings for a load capacity of at least six cubic meters in one embodiment. It is contemplated to construct material hopper 106 from lighter, high-strength materials, such as a high strength plastic hopper. Hipper 106 can be sized for other load capacities depending on the applications and equipment. The hopper 106 may further include one or more hopper extensions (not shown) that increases or extends the width of the hopper opening to facilitate loading and to increase load capacity. Hopper 106 may still further include a vibratory agitator with a timer to facilitate the transport of material from hopper 106 down to primary conveyor 108. In other exemplary embodiments, hopper 106 may be spring mounted to frame 104 to control vibration and assist with material transport, and/or may include exterior mounted skirt adjustments to increase hopper 106 capacity (not shown).

In an embodiment, the primary conveyor 108 includes a primary conveyor belt 116 that can, for example, be driven by the hydraulic motor (not shown). The primary conveyor belt 116 travels around a primary conveyor head roller 120 and a primary conveyor tail roller 118. The primary conveyor belt 116 is further supported by several sets of troughing rollers (not shown). In one example, the primary conveyor belt 116 is an eighteen inch wide two-ply troughing belt. The primary conveyor belt 116 includes adjacently placed cleats to convey the material. Primary conveyor belt 116 may have larger or smaller widths as needed.

In an alternative embodiment, primary conveyor 108 is a positive start cartridge type with a non-troughing conveyor belt. In this embodiment, the track of the primary conveyor 108 is at least twenty inches wide to accommodate a larger variety of materials that spin through a bottom opening (not shown) in the material hopper 106. The cartridge type primary conveyor can be a self-contained unit or stand-alone unit that is slid into the body 102 of the mobile placer 100. The cartridge type primary conveyor can therefore be slid out of the body 102 for repair or replacement. The cartridge type primary conveyor can be cleated as discussed above.

In an embodiment, the primary conveyor 108 is chain driven and includes a plurality of chain links extending around a gear and linked to form a continuous chain (not shown). Here, primary conveyor 108 includes a conveyor mount, a drive assembly (not shown) and a primary conveyor belt 116. The conveyor mount (not shown) can be mounted to the frame 104 of the mobile placer 100. The drive assembly is mounted to the conveyor mount. In one embodiment, the drive assembly includes a set of gears (not shown) having teeth that engage the links of the chain and drive the chain in a particular direction.

As seen in FIG. 1, the head roller 118, the tail roller 120, the troughing rollers, and the primary conveyor belt 116 cooperate to convey material up an incline from an in-feed end 113 of the primary conveyor 108 to a discharge end 114 of the primary conveyor 108. If, for example, troughing rollers are to be used in an application, several sets of troughing rollers may be arranged along the length of the primary conveyor 108 to help support the weight of the material being conveyed. Moreover, additional sets of troughing rollers may be positioned near the in-feed end 114 of the primary conveyor 108. Here, the greater number of troughing rollers at the in-feed end 114 of the primary conveyor 108 helps to support the greater mass of material contained in the material hopper 106 at that position. In one embodiment, the primary conveyor 108 includes one or more skirts and one or more primary conveyor skirt supports to at least partially contain the conveyed material. After the material has been conveyed to the discharge end 114 of the primary conveyor 108, the material is discharged onto the placing or placer conveyor 110, as described in further detail below.

In an embodiment, the mobile placer 100 does not include a cab and is operated entirely by a remote control, such as the HETRONIC™ radio remote control. The remote control can be configured with separate controls for operating the primary conveyor 108 and the placer conveyor 110. The remote control also includes one or more controls to enable the entire mobile placer 100 to move forward and reverse and to be steered in different directions. Additionally, the remote control includes one or more controls to enable the placer conveyor 110 to pivot from side-to-side and tilt up and down.

In another embodiment, the mobile placer 100 includes a four-wheel steering system to facilitate maneuvering in relatively confined areas. In this embodiment, the front and rear axles may, for example, be twenty thousand pound crab steering axles or any other type suitable axle. Wheels 122 and 123 may be 15"×19.5" flotation tires. The front wheels 123 may pivot independently from rear wheels 122, or either the front 123 or rear 122 wheels may pivot while other of the wheels do not pivot.

In one embodiment, the mobile placer includes an additional feeder conveyor that feeds material from a separate feed hopper (not shown) into the main material hopper 106.

The placer conveyor 110 functions in a similar manner to the primary conveyor 108, the functioning of which is discussed above with reference to FIG. 1. As mentioned above, the primary conveyor 108 conveys material that is gravity fed from the hopper 106 up an incline and then discharges the material onto an in-feed end 140 of the placer conveyor 110. In general, the placer conveyor 110 includes at least the following elements: (a) a frame; (b) a plurality of axles rotatably mounted to the frame, each axle having at least one roller coupled to the axle; (c) an endless belt driven around the rollers; and (d) a direct hydraulic drive operatively coupled to one of the axles.

In an embodiment, the placer conveyor 110 mounts to the body 102 of the mobile placer 100 via a swing arm assembly 130. The swing arm assembly 130 includes a swing arm hinge 132 mounted to define a substantially vertical axis, a swing arm yoke 134 mounted to define a substantially horizontal axis, and a swing arm mounting bumper 136 coupled thereto. The placer conveyor 110 is pivotally mounted to the swing arm yoke 134 at an in-feed end 140 of the placer conveyor 110. A conveyor lift cylinder 142 also supports placer conveyor 110, so that discharge end 144 of the conveyor 110 can be free to move side-to-side and up and down. The placing conveyor lift cylinder 142 is coupled to the swing arm assembly 130 mounted to placer conveyor 110 via a placer conveyor upper cylinder mount 146.

The swing arm hinge 132 allows the placer conveyor 110 to rotate about a vertical axis defined by a centerline of the swing arm hinge 132. The placer conveyor 110 may therefore rotate in a clockwise or counterclockwise direction, relative to the swing arm hinge 132, to convey and dispense material in an arc around the mobile placer 100 (FIG. 2). Similarly, the placer conveyor lift cylinder 142 elevates or lowers the placer conveyor 110 relative to a pivot axis defined along the swing arm yoke 134. Alternative arrangements of pivot points, hinges, or ball joints may be employed alternatively to allow the placer conveyor 110 to rotate about both horizontal and vertical axes.

Referring to FIG. 1, in an embodiment, the placer conveyor 110 includes a shield 154 or secondary conveyor mounted adjacent to the in-feed end 140 of the placer conveyor 110. When material is first deposited on the placer conveyor 110, the moving belt of the placer conveyor 110 rapidly accelerates the material to the velocity of the moving belt. The shield 154 is mounted above the placer conveyor 110 and guides the conveyed material and also restricts conveyed material from bouncing or deflecting out of the placer conveyor 110 when the material is initially deposited on the moving belt. The shield 154 also settles the material and assists in guiding the material down the placer conveyor 110. The shield 154 includes a conveyor belt (not shown), which drives at substantially the same velocity and in the same direction as the placer conveyor belt (not shown), such that the material is conveyed between a region defined by the lower surface of the conveyor belt of shield 154 and the upper surface of the placer conveyor belt. In this embodiment, the conveyor belt of the shield 154 is driven by a motor and operated so that the velocity of this conveyor belt is approximately equal to the velocity of the conveyor belt of the placer conveyor 110. In an alternate embodiment, the shield 154 is unpowered and the conveyor belt of the shield is able to freely travel around a plurality of shield rollers 170. The region defined between the shield conveyor belt and the placer conveyor belt 172, in this example, is a substantially parallel area spaced apart and arranged to partially compress, settle, and/or shape the conveyed material. Because the shield 154 is not powered, the conveyor belt of the shield 154 is driven passively by the friction of the material forced into the space between the belt of the placer conveyor 110 and the belt of the shield 154. The shield 154 may further be mounted removably to the placer conveyor 110 and adjustable with respect to the placer conveyor 110 to accommodate different types of material.

As illustrated in FIGS. 1 and 2, the placer conveyor 110 includes a drive axle 186 and drive roller 160. Placer conveyor 110 includes at least one additional axle 198 and roller 180 combination that is located at the opposite end of the placer conveyor frame 196 from the drive axle 186 and roller 160 (FIG. 1). The additional axle 198 and roller 180 combination is a passive assembly. That is, it is not driven. The two rollers 160 and 180 provide a path around which the placer conveyor belt 172 can be driven at a high velocity as the drive axle 186 is rotated by a hydraulic motor (not shown).

In an embodiment, the placer conveyor 110 includes a plurality of sets of placer conveyor rollers or troughing rollers 174 that support the placer conveyor belt 172. The placer conveyor rollers 174 are mounted below the upper surface of the placer conveyor belt 172. At least some of the rollers 174 define axes oblique from the placer conveyor belt 172 such that the placer conveyor belt 172 forms a general trough-like or v-like shape. Rollers 174 could alternatively be slightly conically shaped to form the trough or v-like shape. Alternatively, rollers 174 and positioned and arranged so that placer conveyor belt 172 forms a flat profile.

Troughing rollers 174 facilitate the conveyance of material from the in-feed end 140 of the placer conveyor 110 to the discharge end 144 of the placer conveyor 110. Several sets of troughing rollers 174 are arranged along the length of the placer conveyor 110 to help support the mass of the material. The placer conveyor belt 172 can convey material regardless of whether placer conveyor 110 is in an inclined, horizontal or declined position. In operation, the rollers 174 guide and facilitate the movement of material from the in-feed end 140 of the placer conveyor 110 to the discharge end 144 of the placer conveyor 110.

The placer conveyor belt 172 may be a fourteen inch wide two-ply belt, and/or may include cleats (not shown) extending from and permanently mounted to the placer conveyor belt 104. Placer conveyor belt 172 can be widened as necessary.

A deflector 182 is optionally attached to the discharge end 144 of the placer conveyor 110 to further direct or deflect the conveyed material in a specific direction. In one example, the deflector 182 is arranged to deflect material projected from the discharge end 144 of the placer conveyor 110 downwardly into the ground. Downward deflection is used in, for example, a roadside application where it is not necessary to project the material over a long distance. In another example, the deflector 182 is adjusted so deflect the material upward to discharge the material into the air. This may be appropriate in an application with limited access where the placing conveyor 110 may not be able to pivot vertically. Deflector 182 may be one or more of adjustable, removable, and permanently fixed to placer conveyor 110.

In one embodiment, the in-feed end 140 of the placer conveyor 110 is located below a head roll 120 of the primary conveyor 108. As the material is conveyed over the discharge edge of the primary conveyor 108, the material drops accordingly from the primary conveyor belt 116 onto the placer conveyor 110.

In one embodiment, the placer conveyor 110 is able to rotate approximately one-hundred eighty degrees, that the placer conveyor can be turned to be positioned adjacent to the primary hopper. The mobile placer thereby becomes a relatively compact unit that can be driven along a roadway.

Auxiliary Steering System Having Direct Hydraulic Drive System

As illustrated in FIG. 3, in one embodiment, the overall steering system 206 of the mobile placer 100 includes a steering column 208, a steering wheel 210, a power steering manifold 212, steerable wheels 123 (FIG. 1) mounted on an axle 150 (FIG. 1), and an auxiliary steering system 200, which are operatively coupled together to steer the mobile placer 100 in either a manual drive mode or a remote drive mode.

Power steering manifold 212 is mounted to the frame 104 of the mobile placer 100 and is pressurized via hydraulic fluid supplied from fluid reservoir 250 and through power steering hydraulic conduit 214. In an embodiment, the hydraulic fluid reservoir 250 supplying the power steering manifold 212 is separate from the hydraulic fluid reservoir 232 supplying the auxiliary steering system 200. The power steering manifold 212 provides steering assistance in either the manual drive mode or the remote drive mode. The steering wheel 210 is coupled to the steering column 208, and the upper portion of the steering column 208 is supported by a bearing (not shown) mounted to a portion of the frame 104 of the mobile placer 100. A direct drive hydraulic motor 202 is mounted in-line between the power steering manifold 212 and the steering column 208.

Direct drive hydraulic motor 202 is one component of the auxiliary steering system 200 and provides additional steering assistance (i.e., supplementing the steering assistance provided by power steering manifold 212) when the mobile placer 100 is operated in the remote drive mode. In the manual drive mode, the vehicle operator is located in the vehicle cab 124 (FIG. 1) and is manually manipulating the steering wheel 210 to steer the mobile placer 100. In the remote drive mode, the vehicle operator is re-located out of the cab 124 of the mobile placer 100 and is remotely controlling the auxiliary steering system 200 to cause the direct hydraulic drive motor 202 to steer the mobile placer 100. That is, in the remote drive mode, the direct hydraulic drive motor 202 provides remote steering control of the mobile placer 100 in the absence of direct operator control of the steering wheel 210. In the remote drive mode, because the steering column 208 and the steering wheel 210 are operatively coupled to the direct drive hydraulic motor 202, the steering wheel 210 turns passively in response to the remote operator control of the direct drive hydraulic motor 202.

Referring to FIG. 3, a drive shaft 218 couples the power steering manifold 212 to the direct drive hydraulic motor 202.

In an embodiment, a u-joint 216 is mounted to the power steering mechanism 212 to allow for any misalignment between the power steering manifold 212 and the direct drive hydraulic motor 202. The direct drive hydraulic motor 202 is also mounted to the frame 104 of the mobile placer 100 via a mounting bracket 224. Another u-joint 220 is coupled to the opposite side of the direct drive hydraulic motor 202. This u-joint 220 allows for any misalignment between the direct drive hydraulic motor 202 and the steering column 208. In an embodiment, the steering column 208 includes a spline adjuster 222 to allow for lateral movement of the steering column 208 and steering wheel 210 relative to the mounting bracket 224 and frame 104 of the mobile placer 100. Therefore, as illustrated in FIG. 3, the direct drive hydraulic motor 202 is mounted in an inline fashion between the power steering manifold 212 and the steering column 208. Drive shaft 218 in one embodiment runs directly through the interior portion 270 (FIG. 5) of the direct drive hydraulic motor 202, as described further below.

As illustrated in FIGS. 3 and 4, auxiliary steering system 200 further includes: (a) a hydraulic pump 230; (b) a hydraulic fluid reservoir 232; (c) a direct drive hydraulic motor 202; (d) a remote signal transmitter 300; (e) a signal receiver 302; (f) a controller 304; (g) a plurality of valves 306; (h) a power take-off 312; (i) a bypass valve 314; and (j) hydraulic fluid conduits 234, 236, 314 and 320. The fluid conduits 234, 236, 314 and 320 can include any of a hydraulic hose, tube, or any other conduit type that is capable of containing and transmitting hydraulic fluid at the required operating pressures. The power take-off 312 draws mechanical power from the main engine 310 of the mobile placer 100 and uses it to power the hydraulic pump 230. The hydraulic pump 230 pumps hydraulic fluid from the hydraulic fluid reservoir 232 through fluid conduits 234, 236, 314 and 320 to maintain the auxiliary steering system 200 at a desired operating pressure. A pressure regulator may be used to control the hydraulic pressure of the auxiliary steering system 200. The fluid conduits 320, 234, 236 and 314 are connected to a set of valves 306 or valve manifold. Fluid conduits 234 and 236 are also coupled to ports 242 and 240, respectively, (FIG. 3) of the direct drive hydraulic motor 202. The hydraulic fluid can be pumped in either direction through the direct drive hydraulic motor 202 depending on the steering commands provided by the signal transmitter 300 and the corresponding valves activated in valve manifold 306.

In operation, a vehicle operator operates a signal transmitter 300 (e.g., a remote control) to send radio signals to a signal receiver 302. In an embodiment, the remote control maybe either a HETRONIC™ or Omnex™ radio remote control. Besides the remote control of auxiliary steering system 200, remote transmitter 300 also switches valves in valve manifold 306 via electrical controller 304 to an auxiliary drive motor 340, which causes the entire mobile placer 100 to move forwards and backwards. As shown in FIG. 4, fluid conduits 330 and 332 connect the auxiliary drive motor 340 to valve manifold 306, which enables the auxiliary drive motor 340 to be powered by the same hydraulic pump 230 that powers the direct drive hydraulic motor 202 for steering.

Regarding the auxiliary steering system 200, to turn the wheels 123 (FIG. 1) of the mobile placer 100 in one direction, the signal receiver 302 receives a signal sent by the signal transmitter 300 (and operator) and transmits the signal to controller 304. The controller 304 in turn electrically causes certain valves in the valve manifold 306 connected to fluid conduits 234 and 236 to open or close. To steer the wheels 123 in a first direction, the hydraulic pump 230 pumps the hydraulic fluid through, e.g., hydraulic line 234 and into port 242 (FIG. 3) of the direct drive hydraulic motor 202. The force of the pressurized hydraulic fluid is transmitted to drive shaft 218 as the fluid travels in a given direction through the direct drive hydraulic motor 202. The force of the hydraulic fluid transmitted to the drive shaft 218 causes the steering column 208 to rotate and also causes the wheels 123 of the mobile placer 100 to steer in a first direction with the aid of power steering mechanism 212. The hydraulic fluid then flows through port 240 of the direct drive hydraulic motor 202 and flows through valve manifold 306, thus completing a closed hydraulic circuit.

To steer the wheels 123 in the opposite direction, the direction of flow of hydraulic fluid through the closed hydraulic circuit is reversed. Here for example, hydraulic pump 230 pumps the hydraulic fluid from the fluid reservoir 232, through fluid conduit 236 and into port 240 of the direct drive hydraulic motor 202. As described above, the force of the pressurized hydraulic fluid is transmitted to the drive shaft 218 as the fluid travels through the direct drive hydraulic motor 202. The force of the hydraulic fluid transmitted to the drive shaft 218 causes the steering column 208 to rotate in the reverse direction and also causes the wheels of the vehicle to turn in the opposite direction via the aid of the power steering manifold 212. The hydraulic fluid then flows through port 242 of the hydraulic motor 202, and flows through hydraulic line 234 back to the hydraulic valve manifold 306 for reuse, thus completing a closed hydraulic circuit.

Thus, it should be appreciated that the direct drive hydraulic steering motor 202 can be operated in a bidirectional manner such that the drive shaft 218 is rotated in either a clockwise or counterclockwise manner, causing the wheels 123 of the mobile placer 100 to turn to the right or the left. Pump 230 supplies hydraulic power and the switching of hydraulic valves in valve manifold 306 via operator and remote controller 300 determines which way drive shaft 218 of the direct drive hydraulic steering motor 202 spins.

In the illustrated embodiment, the auxiliary steering system 200 includes a bypass valve 308 that is opened when the vehicle is operated in manual drive mode (i.e., where the vehicle operator is located in the cab). As illustrated in FIG. 4, bypass valve 308 is coupled to fluid conduit 314. Fluid conduit 314 is fluidly coupled between fluid conduits 234 and 236. The rotation of the drive shaft 218 inside the direct drive hydraulic motor 202 forces hydraulic fluid to open bypass valve 308, and the remaining valves in valve manifold 306 which are connected to fluid conduits 234 and 236 are closed. In manual drive mode, therefore when the operator of the vehicle is turning the steering wheel 210, the drive shaft 218 in the direct hydraulic drive motor 202 is being rotated by the operator only, with auxiliary steering system 200 being neutralized.

Thus, even when the mobile placer 100 is being operated in remote drive mode, the vehicle operator can enter the cab 124 (FIG. 1) of the mobile placer 100 and physically turn the steering wheel 210 to override the commands sent by the controller 304. As discussed, the operating hydraulic pressures of the auxiliary steering system 200 may be overcome manually by a vehicle operator so as not to prevent a vehicle operator from climbing in the cab 154 of the vehicle and manually turning the steering wheel while system 200 is being activated. This feature is needed so that a vehicle operator of average strength can quickly climb into the vehicle and take control.

As mentioned above, direct drive hydraulic motor 202 transforms fluid energy from the hydraulic fluid pressurized via pump 230 into rotary mechanical power. The rotary mechanical power is applied to the shaft or drive axle 218 of the auxiliary steering system 200. In general, the direct drive hydraulic motor 202 includes: (a) a driving surface area or pressure surface that is subject to a pressure differential; (b) a means for porting pressurized hydraulic fluid to the pressure surface to achieve either a clockwise or counterclockwise rotation of the drive shaft; and (c) a mechanical connection between the pressure surface and the drive shaft. In an example embodiment illustrated in FIG. 5, the direct drive hydraulic motor 202 is a rotary vane type motor that includes: (a) a rotor 284 mounted to the drive shaft 218 and having a plurality of rotary vanes 288a, 288b and 288c mounted or coupled to rotor 284; (b) inlet/outlet port 240 and inlet/outlet port 242; (c) a seal plate 282 mounted about the rotor 284; and (d) a plurality of rotational seal members 280 and 281 that cooperate with the seal plate 282 and the rotary vanes 288a, 288b and 288c.

Figure 5:
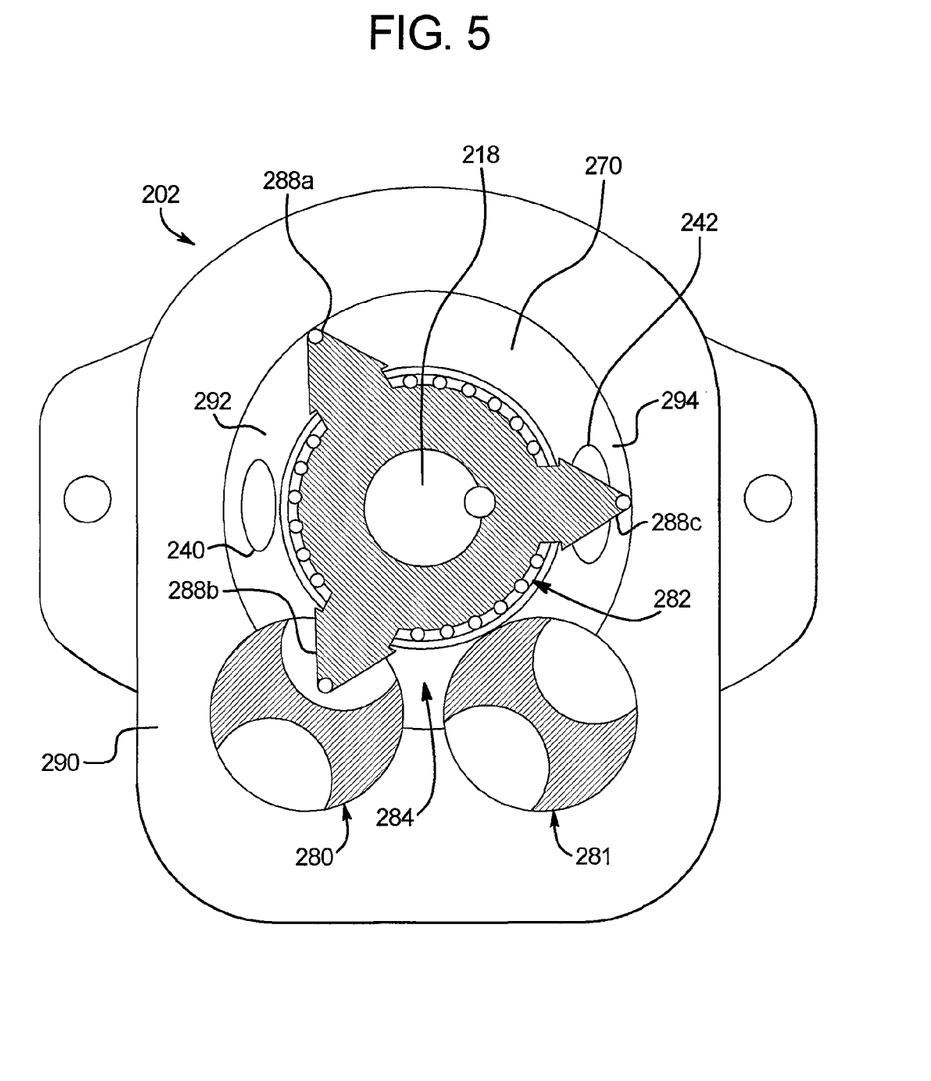
FIG. 5 is a cross-sectional view of a direct hydraulic drive motor.

Seal members are driven in a 1:1 ratio with shaft 218 and include openings as shown that allow vanes 288a to 288c to pass through the seal member as shaft 218 spins. Seal member 280 and 281 are accordingly positioned in geared relationship with vanes 288a to 288c to enable such a meshed combination of rotation to occur. Seal members contact both seal plate 282 and the inside wall of housing 290, which defines an interior hydraulic fluid space 270 between housing 290 and shaft 218. Seal members 280 and 281 accordingly force hydraulic fluid entering from either port 240 or 242 to flow in one of clockwise and counterclockwise direction to exit the other of port 242 or 240. Hydraulic fluid flowing in the counterclockwise direction causes a corresponding directional rotation of shaft 218. Hydraulic fluid flowing in the clockwise direction causes a corresponding directional rotation of shaft 218.

In an alternate embodiment, the overall steering system of the vehicle includes the auxiliary steering system 200 described above, but which does not use or require a power steering manifold 212. Here, the differential pressure for the auxiliary steering system 200 needs to be higher without the aid of the power steering manifold 212. The bypass system operates the same as above, allowing the higher pressures to reach both ports 240 and 242 of the motor 202 so that no differential pressure or resulting auxiliary hydraulic force is realized within the motor 202, which the operator would have to overcome assuming the cab operator is attempting to steer in an opposite direction than the remove operation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A vehicle comprising:
a frame;
a vehicle steering system, at least a portion of the vehicle steering system mounted to the frame, the vehicle steering system including a rotatable steering column;
wheels coupled to the steering column and configured to turn in response to a rotation of the steering column; and
an auxiliary steering system configured to rotate the steering column during remote vehicle operation, the auxiliary steering system including a direct hydraulic drive motor directly coupled to the steering column, wherein the direct hydraulic drive motor includes a rotor mounted to a drive shaft, a plurality of vanes operatively coupled to the rotor, a seal plate mounted about the rotor, and a plurality of rotational seal members that cooperate with the seal plate and the plurality of vanes.

2. The vehicle of claim 1, wherein the vehicle is a mobile material placer.

3. The vehicle of claim 2, wherein the mobile material placer comprises a body, a material hopper coupled to the body and configured to receive and store material, a feeder conveyor coupled to the body and configured to receive material stored by the material hopper, and a placer conveyor pivotably coupled to the body.

4. The vehicle of claim 3, wherein the placer conveyor further comprises an in-feed end and a discharge end, the in-feed end alignable with a discharge end of the feeder conveyor.

5. The vehicle of claim 1 further comprising a controller, and a remote control system configured to wirelessly transmit signals to the controller, the controller configured to control the operation of the auxiliary steering system.

6. The vehicle of claim 1, wherein the auxiliary steering system further comprises a hydraulic pump, a hydraulic fluid reservoir, and wherein the direct hydraulic drive motor and the hydraulic pump are fluidly connected to the hydraulic fluid reservoir.

7. The vehicle of claim 6, the direct hydraulic drive motor comprising a first hydraulic fluid port and a second hydraulic fluid port, the hydraulic drive motor configured to rotate the steering column in a bidirectional manner in response to hydraulic fluid flow from the hydraulic pump.

8. The vehicle of claim 1, wherein the hydraulic drive motor is mounted to the steering column in an in-line fashion.

9. A mobile material placer comprising:
a body;
a material hopper coupled to the body and configured to receive and store material;
a feeder conveyor coupled to the body and configured to receive material stored by the material hopper;
a placer conveyor coupled pivotably to the body, the placer conveyor including an in-feed end and a discharge end; the in-feed end of the placer conveyor is alignable with a discharge end of the feeder conveyor;
an auxiliary steering system including a direct hydraulic drive motor directly coupled to a steering column of the mobile material placer, the auxiliary steering system configured to cause rotation of the steering column, wherein the direct hydraulic drive motor includes a rotor mounted to a drive shaft, a plurality of vanes operatively coupled to the rotor, a seal plate mounted about the rotor, and a plurality of rotational seal members that cooperate with the seal plate and the plurality of vanes; and
an auxiliary drive mechanism configured to cause the mobile material placer to move forward and backward.

10. The mobile material placer of claim 9, further comprising a controller, and a remote control system configured to wirelessly transmit signals to the controller, the controller configured to control operation of the auxiliary steering system and the auxiliary drive mechanism.

11. The mobile material placer of claim 9, wherein the direct hydraulic drive motor is coupled to the steering column, and wherein the auxiliary steering system further comprises a hydraulic pump, a hydraulic fluid reservoir, wherein the hydraulic drive motor and the hydraulic pump are fluidly connected to the hydraulic fluid reservoir.

12. The vehicle of claim 11, the direct hydraulic drive motor comprises a first hydraulic fluid port and a second hydraulic fluid port, the direct hydraulic drive motor configured to rotate the steering column in a bidirectional manner in response to hydraulic fluid flow from the hydraulic pump.

13. A vehicle comprising:
an auxiliary steering system including a direct hydraulic drive motor directly coupled to a steering column of the vehicle, wherein the direct hydraulic drive motor includes a rotor mounted to a drive shaft, a plurality of vanes operatively coupled to the rotor, a seal plate mounted about the rotor, and a plurality of rotational seal members that cooperate with the seal plate and the plurality of vanes;
an auxiliary drive mechanism; and
a manual mode that enables an operator to:
  (i) steer the vehicle by turning a steering wheel connected to the steering column, and
  (ii) move the vehicle forwards and backwards by operating an accelerator, and a remote mode that enables the operator to:
  (i) steer the vehicle via remote operation of the auxiliary steering system, and
  (ii) move the vehicle forwards and backwards via remote operation of the auxiliary drive mechanism.

14. The vehicle of claim 13, wherein the manual mode is configured to override the remote mode when the operator turns the steering wheel.

15. The vehicle of claim 13, wherein the auxiliary steering system further comprises a hydraulic pump, a hydraulic fluid reservoir, and wherein the hydraulic drive motor and the hydraulic pump are fluidly connected to the hydraulic fluid reservoir.

16. The vehicle of claim 15, wherein the hydraulic drive motor comprises a first hydraulic fluid port and a second hydraulic fluid port, the hydraulic drive motor configured to rotate the steering column in a bidirectional manner in response to hydraulic fluid flow from the hydraulic pump.

17. The vehicle of claim 13, wherein the vehicle is a mobile material placer.

18. The vehicle of claim 17, wherein the mobile material placer comprises a body, a material hopper coupled to the body and configured to receive and store material, a feeder conveyor coupled to the body and configured to receive material stored by the material hopper, the feeder conveyor including a discharge end, and a placer conveyor pivotably coupled to the body, the placer conveyor including an in-feed end and a discharge end, the in-feed end alignable with the discharge end of the feeder conveyor.

19. The vehicle of claim 1, wherein the direct hydraulic drive motor is directly coupled to the steering column via a U-joint.

20. The mobile material placer of claim 9, wherein the direct hydraulic drive motor is directly coupled to the steering column via a U-joint.

21. The vehicle of claim 13, wherein the direct hydraulic drive motor is directly coupled to the steering column via a U-joint.

22. The mobile material placer of claim 9, which includes a hydraulic pump, wherein both the auxiliary drive system and the auxiliary steering system are powered by the hydraulic pump.

* * * * *